United States Patent [19]
Layden et al.

[11] Patent Number: 4,766,096

[45] Date of Patent: Aug. 23, 1988

[54] SILICON NITRIDE WHISKER REINFORCED GLASS MATRIX COMPOSITES

[75] Inventors: George K. Layden, Hartford; Karl M. Prewo, Vernon, both of Conn.

[73] Assignee: The United States of America as represented by the Secretary of the Air Force, Washington, D.C.

[21] Appl. No.: 18,246

[22] Filed: Feb. 24, 1987

[51] Int. Cl.$^4$ ................ C04B 35/80; C04B 35/58; C03C 14/00; C03C 8/14

[52] U.S. Cl. ........................................ 501/17; 501/32; 501/95; 501/97

[58] Field of Search .................. 501/17, 19, 20, 23, 501/32, 95, 97

[56] References Cited

U.S. PATENT DOCUMENTS

| | | | |
|---|---|---|---|
| 3,828,699 | 8/1974 | Bowen | 109/80 |
| 4,104,442 | 8/1978 | Sussmuth | 428/428 |
| 4,268,562 | 5/1981 | Bacon et al. | 428/113 |
| 4,388,255 | 6/1983 | Simpson | 501/154 X |

*Primary Examiner*—Ferris H. Lander
*Attorney, Agent, or Firm*—Charles E. Bricker; Donald J. Singer

[57] ABSTRACT

An improved composite material consisting of silicon nitride whiskers uniformly dispersed through a glass matrix and a method for making the composite which comprises the step of dispersing the whiskers in a suitable liquid and separating off the fines and, optionally, the step of treating the dispersed whiskers with HF.

2 Claims, No Drawings

SILICON NITRIDE WHISKER REINFORCED GLASS MATRIX COMPOSITES

RIGHTS OF THE GOVERNMENT

The invention described herein may be manufactured and used by or for the Government of the United States for all governmental purposes without the payment of any royalty.

BACKGROUND OF THE INVENTION

This invention relates to a fiber reinforced structural material. More specifically, this invention relates to a composite structure comprised of high strength silicon nitride whiskers in a glass matrix.

Fiber reinforced organic matrix composites are widely used and accepted as structural materials because of their desirable attributes of high strength high modulii and low density. In general, most of these composites comprise an organic polymer matrix, such as an epoxy resin, a polyimide, a polycarbonate, or similar material. The matrices are reinforced with a wide variety of fibers including glass, carbon, graphite and boron. However, even the best of these composites are limited to an operational temperature below about 600° F. (300° C.).

The severe environment encountered by advanced missile systems precludes the use of organic matrices. Radomes for such systems must have acceptable resistance to rain and particle erosion as well as high thermal stability and thermal shock resistance. Generally, ceramic materials meet one or more of these requirements. One further requirement for radomes, that being transparency to X band radiation, precludes the use of certain ceramic materials. Silicon carbide yarn reinforced glass and glass ceramic composites, although very strong, tough, and environmentally stable, have been found to be essentially opaque to X band radiation. Other materials, such as boron nitride reinforced glass and glass ceramic composites, are X band transparent, but are extremely weak and brittle.

Thus, what is desired is a composite material which exhibits superior strength and toughness, high thermal stability and is transparent to X band radiation.

Accordingly, it is an object of the present invention to provide an improved silicon nitride whisker, glass matrix composite material.

Another object of the present invention is to provide a process for making an improved silicon nitride whisker glass matrix composite material.

Other objects and advantages of the present invention will become apprent to those skilled in the art from a reading of the following detailed disclosure.

DESCRIPTION OF THE INVENTION

In accordance with the present invention there is provided a composite material consisting of silicon nitride whiskers dispersed through a glass matrix.

This improved composite material is prepared by the steps of:

(a) dispersing silicon nitride whiskers in a suitable liquid and separating off the fines;

(b) removing the liquid from the remaining silicon nitride whiskers;

(c) blending a desired quantity of the whiskers from step (b) with a desired quantity of glass frit and a temporary binder in a suitable liquid to form a mixture;

(d) coating a suitable carrier substrate with a layer of the mixture;

(e) evaporating the liquid out of the layer;

(f) separating the thus-dried layer from the carrier; and (g) stacking a plurality of such dried layers in a jig and hot-pressing the layers together at a temperature and pressure sufficient to cause the glass particles to flow to form a void-free matrix throughout which are dispersed the silicon nitride whiskers. The temporary binder is burnt out during the hot-pressing operation, or in a separate heat treatment prior to hot pressing.

Silicon nitride whiskers are available commercially from Versar Incorporated, Springfield, VA and Tateho Chemical Industries, Hyoga-Ken, Japan. The Versar whiskers are in the form of intergrown mats consisting of whiskers having diameters ranging from under 1 micron to about 20 microns, with lengths ranging from several microns to several inches. The Tateho whiskers generally have diameters ranging from 0.2 to 0.5 microns and lengths ranging from about 50 to 300 microns.

The silicon nitride whiskers are processed by first dispersing a quantity of whiskers in a suitable liquid, such as water at a relatively low shear, to avoid damaging the whiskers. In general, about 2 g. of whiskers per liter of water will provide sufficient volume to ensure separation of the whiskers. A blender may be used to disperse the whiskers. Generally about 1 to 5 minutes at low speed is sufficient to disperse the whiskers.

The whiskers may then be treated with hydrofluoric acid to remove silica or silicate impurities. It is convenient to combine several batches of the whiskers in water dispersions in a large container and add about 50 to 100 ml of concentrated HF per liter of the whisker/water dispersion with mixing. This mixture, after stirring is allowed to settle about 30 to 90 minutes. The liquid above the settled-out whiskers is then removed. The remaining whisker mass is mixed with distilled water, allowed to settle, as above, and the liquid removed. This washing step is repeated 1 to 4 times to ensure removal of the HF. The remaining whisker mass is then filtered and dried.

A weighed portion of the dried whiskers is dispersed in water or a lower alkyl alcohol. A desired quantity of glass frit and a suitable temporary binder material is then added to the dispersion of whiskers. In general, the ratio of whiskers to glass, by weight can range from about 1:2 to 2:1, preferably about 1:2 to 1:1.2. The combined quantity of whiskers and glass should be about 3 to 8 weight percent of the resulting mixture, preferably about 5–6 weight percent. About 1 gram of the temporary binder material per gram of whiskers has been found to be satisfactory for later processing.

The mixture of whiskers, glass frit and temporary binder material is spread in a layer onto a carrier substrate and the liquid is evaporated to provide a precursor sheet.

The temporary binder material can be any material known in the art which is miscible with the liquid medium, i.e. water or a C1 to C3 alcohol, and which, when the liquid is removed, is solid at room temperature. A suitable binder for use with water medium is Rhoplex, an acrylic latex available from Rhom and Haas, Inc., Philadelphia, PA.

To make the silicon nitride whisker reinforced glass matrix of this invention, any of a large number of glasses may be used. Any of the glasses listed in Table I, for example, as well as others, may be used for the glass matrix. Table I lists the physical characteristics of glasses suitable for this invention.

TABLE I

| Glass | Density (g/cc) | Coeff. of Expansion ($10^{-7}$ per °C.) | Dielect. Const. | Modulus GPa | Modulus $10^6$ psi | Softening point (°C.) | Working Temp (°C.) |
| --- | --- | --- | --- | --- | --- | --- | --- |
| Corning 1723 aluminosilicate glass | 2.64 | 46 | 6.3 | 69 | 10 | 900 | 1168 |
| Corning 7740 Borosilicate glass | 2.23 | 33 | 4.6 | 64 | 9 | 821 | 1252 |
| Corning 7913 | 2.18 | 7.5 | 3.8 | 69 | 10 | 1530 | — |

The glass chosen must have a suitable dielectric constant if it is to be used for radar or other electromagnetic window applications. On this basis, the 96% silica and borosilicate glass are outstanding. Additionally, the glass chosen must be as resistant as possible to laser damage.

The composite material of this invention can be made by stacking together a plurality of the precursor sheets, each of which consists of an appropriate mixture of silicon nitride whiskers, glass frit and a temporary binder, and hot-pressing the sheets together at a temperature and pressure sufficient to cause the glass to flow and form a void-free matrix throughout which are dispersed the silicon nitride whiskers. The temporary binder may be burnt out during the hot-pressing operation in some embodiments of this invention, however it has generally been found preferable to burn out the binder in a heat treatment in air prior to hot pressing.

The conditions of hot-pressing are determined by the physical properties of the glass. In general, the temperature will range from about 50° C. to about 300° C. above the normal softening point of the glass, the pressure will range from about 500 to 4000 psi and pressing time will range from about 5 min to 6 hours. The hot-pressing may be carried out under vacuum or under a suitable inert atmosphere such as argon, using graphite or metal dies coated with a suitable high temperature release agent such as, for example, collodial boron nitride.

The following examples illustrate the invention:

EXAMPLE I

Small clumps of matted whiskers weighing about 1 gram were pulled from mats of silicon nitride whiskers obtained from Versar Incorporated and added to about 500 ml of water in a blender jar. The mixture was blended about 3 minutes at the low speed setting of a Waring Model 5011 blender. Ten such batches were combined, after blending, in a plastic pail and 400 ml conc. HF was added thereto. The mixture was stirred, then allowed to settle for about 1 hour. The liquid above the settled-out whiskers, containing the finest whiskers in suspension, was drawn off using suction from an aspirator. The settled-out whiskers were washed by adding about 5-l. of distilled water, stirring the mixture and allowing the mixture to settle for about an hour. The liquid above the settled-out whiskers was drawn off, as above. The washing procedure was repeated for a total of four washings.

The whisker mass was then collected using an aspirator to draw the whiskers and water remaining in the pail through a millipore filter. The whisker cake was then dried.

EXAMPLE II 21.6 g of the whiskers obtained in Example I were dispersed in 900 ml of distilled water. To this were added 32.6 g of Corning 1723 glass (approx. 325 mesh) frit and 22 g of Rhoplex Grade AC-33 acrylic latex. The mixture was thoroughly stirred then poured into a pan lined with a polyester release film. The water was evaporated off, yielding a paper-like precursor sheet.

Three-inch squares were cut from the precursor sheet. A plurality of such squares were stacked in a stainless steel jig. The jig containing the stacked squares was heated to 500° C. in an air atmosphere for 1.5 hours to decompose the temporary binder. The temperature was thereafter increased to 750° C. for 30 min. to at least partially sinter the glass frit to allow transfer of the squares to a hot-pressing jig without disturbing the distribution of whiskers and glass. After cooling to room temperature, the stack of squares was transferred to a graphite hot-pressing mold. The mold was placed in a hot press, heated to 1100° C., pressed at 1000 psi for 5 minutes, then cooled to room temperature.

The resulting hot-pressed composite plate was ground and cut into 0.10"×0.20"×3.0" test bars. These bars were tested in three point flexure at a span:depth ratio of 25:1 at a loading rate of 0.005 inch per minute. These composites exhibited a mean flexural strength of 21 ksi. In contrast, unreinforced Type 1723 glass has a mean flexural strength below 10 ksi.

EXAMPLE III

Small clumps of matted whiskers were pulled from mats of silicon nitride whiskers obtained from Versar Incorporated, weighed and slurried with Corning 1723 glass frit and Rhoplex acrylic latex, then formed into paper-like precursor sheet as described in Example II. These whiskers were not treated with HF as described in Example I. The thus-formed precursor sheet was processed into a hot-pressed composite plate, which was ground and cut into test bars, as described in Example II. This composite exhibited a mean flexural strength of 12 ksi.

Microphotographs of the composite structure of this Example exhibited good "wetting" of the fiber clumps by the 1723 matrix glass, however, the distribution of the fibers was clumpy. In contrast, microphotographs of the composite structure of Example II exhibited a reasonably planar isotropic distribution of the fibers as well as good "wetting" of the fibers. The homogeneity of the latter composite is reflected in the higher strength of this composite as compared to the strength of the composite of Example III.

Various modifications may be made in the present invention without departing from the spirit of the invention or the scope of the appended claims.

I claim:

1. A method for preparing a composite material which comprises the steps of:
   (a) dispersing silicon nitride whiskers in a suitable liquid at low shear and separating off the fines;
   (b) removing the liquid from the remaining silicon nitride whiskers;
   (c) blending a desired quantity of the whiskers from step (b) with a desired quantity of glass frit and a temporary binder in a suitable liquid to form a mixture;
   (d) coating a suitable carrier substrate with a layer of said mixture;
   (e) evaporating the liquid out of said layer;
   (f) separating the thus-dried layer from said carrier; and
   (g) stacking a plurality of dried layers in a jig and hot-pressing the layers together at a temperature and pressure sufficient to cause the glass particles to flow to form a void-free matrix throughout which are dispersed said silicon nitride whiskers.

2. The method of claim 1 further comprising the step of treating said whiskers dispersed in said liquid with hydrofluoric acid.

* * * * *